July 31, 1956  J. D. RUSSELL ET AL  2,756,867
CONVEYOR CHAIN WITH REPLACEABLE FLIGHTS
Filed Nov. 21, 1950  2 Sheets-Sheet 1
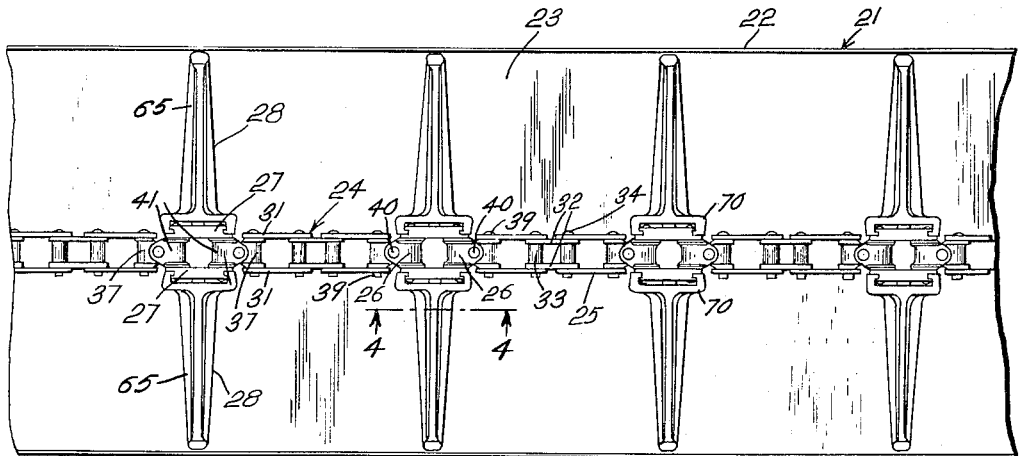
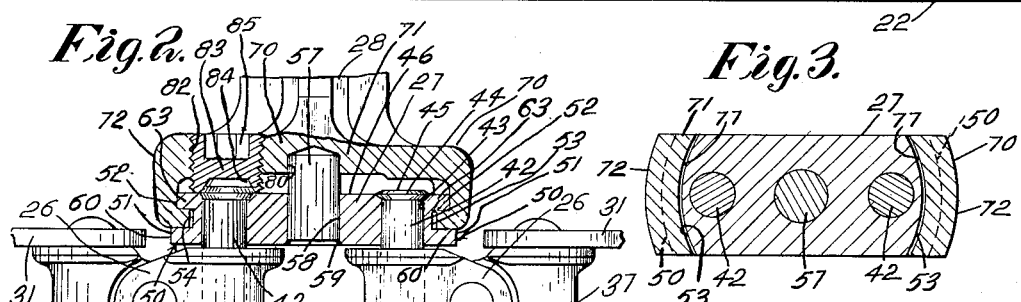
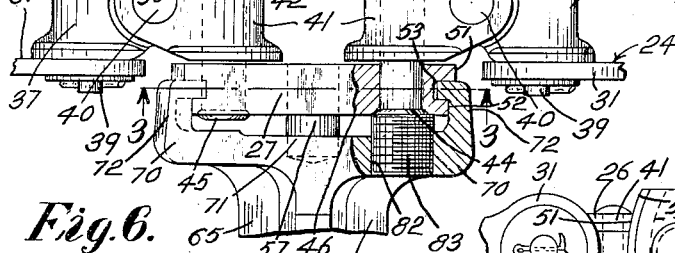
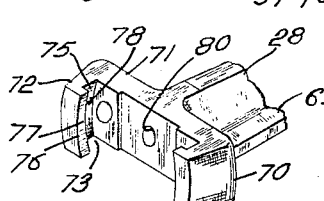
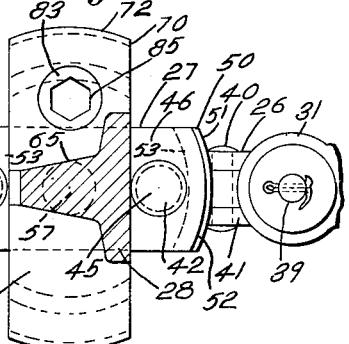
Inventors:
John D. Russell.
Lloyd C. Felderman.
by Amos A. Maxon
Attorney.

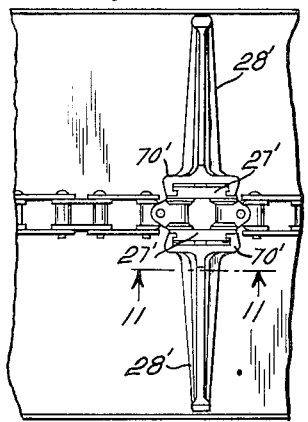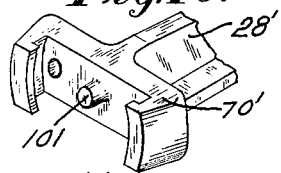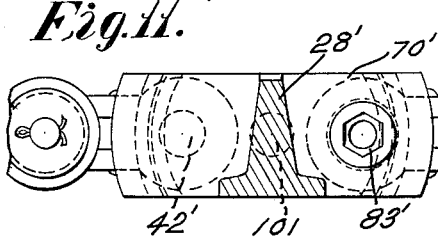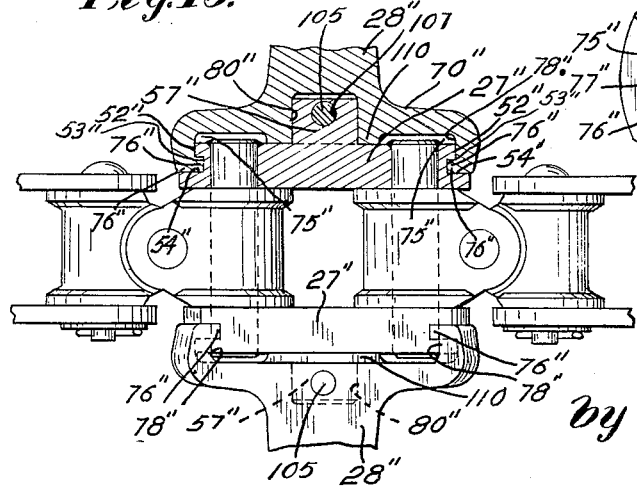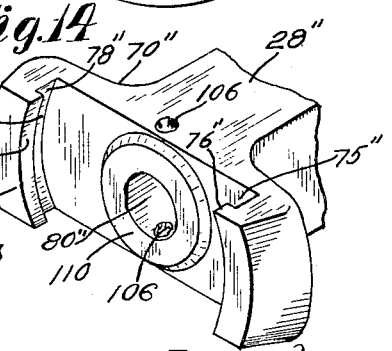

United States Patent Office 2,756,867
Patented July 31, 1956

2,756,867

CONVEYOR CHAIN WITH REPLACEABLE FLIGHTS

John D. Russell and Lloyd G. Felderman, Franklin, Pa., assignors to Joy Manufacturing Company, Pittsburgh, Pa., a corporation of Pennsylvania Application November 21, 1950, Serial No. 196,857

17 Claims. (Cl. 198—176)

Our invention relates to conveyor chains and more particularly to chains of the flight type having the flight moving chain disposed centrally and the flights extending oppositely laterally from the chain proper.

Conveyor chains employing a central chain with flights extending in opposite directions from opposite sides of the center chain are used widely for the conveying of material. In some uses, such as on loading machines, the flights are required to move very heavy masses of material, such as large lumps of iron ore, large lumps of coal, etc. These large lumps must be moved along the deck plates over which the chain moves by the flights, which travel close to or frequently in actual contact with the deck plates. If the points of engagement of the flights with heavy masses of the character mentioned, happen to be near the free ends of the flights very heavy bending stresses are imposed on the flights. Moreover, when loading from the bottom of a pile, large chunks of material may frequently drop from above onto the flights. It will therefore be understood that bending of the flights or breakage thereof is not at all uncommon.

It is desired that the conveyor chain have the chain portion thereof as strong as possible, and that it be not necessary to disturb any actual element of the chain proper, with respect to the other elements of the chain proper, in order to replace a flight. It is further desirable, since flights should be replaceable, but at the same time very firmly secured to the chain proper, that rugged connections permitting ready detachment and replacement be provided.

It is an object of the present invention to provide an improved conveyor chain. It is another object to provide an improved conveyor chain of the flight type having replaceable flight elements. It is a further object of the invention to provide improved connecting means between replaceable flights and the flight moving chain. It is still another object of the invention to provide an improved flight structure per se. Other objects and advantages of the invention will hereinafter more fully appear.

In the accompanying drawings, in which three embodiments which the invention may, from its various aspects, assume in practice are shown for purposes of illustration:

Fig. 1 is a fragmentary top view of a portion of a flight conveyor chain and its associated trough;

Fig. 2 is an enlarged fragmentary view, with parts broken away, showing one embodiment of the invention;

Fig. 3 is a section on the plane of the line 3—3 of Fig. 2;

Figs. 4 and 5, both taken on the plane of the section line 4—4 of Fig. 1 but on an enlarged scale, are side elevational views of a connection between a flight and a chain, respectively with the parts in connected position and with the parts in the course of being connected;

Fig. 6 is a perspective view, on a smaller scale, of the attachment end of a flight element;

Fig. 7 is a view similar to Fig. 1 showing another embodiment of the invention;

Fig. 8 is an enlarged view, with parts broken away, and generally similar to Fig. 2, showing details of the embodiment of the invention illustrated in Fig. 7;

Fig. 9 is a longitudinal section on the plane of the line 9—9 of Fig. 8;

Fig. 10 is a perspective view, on a smaller scale than Fig. 8, of the attachment end of a flight constructed according to the second embodiment of the invention;

Figs. 11 and 12 are views each taken on the plane of the line 11—11 of Fig. 7, the first showing a connection between a flight and the chain in the fully connected position of the parts and the second showing a flight element in the course of being connected to the chain;

Fig. 13 is a view similar to Figs. 2 and 8 showing a further modification of the invention;

Fig. 14 is a perspective view on an enlarged scale showing the attachment end of a flight having a connection of the type employed in the embodiment of Fig. 13.

Figs. 1 to 6 inclusive illustrate one embodiment of our invention. Noting Fig. 1, it will be observed that a conveyor trough 21 has side flanges 22 and a deck plate 23; and a conveyor chain generally designated 24 is adapted to traverse the surface of the deck plate 23 and move material along it.

The chain 24 includes, as illustrated, sections of plain roller chain, these sections being numbered 25, and having universal joint connections 26 with the link elements 27 constituting mountings for flights 28. Sections 25 are made up of cooperating link or plate elements 31 and 32, rollers 33 and connecting pins 34. At each end of a section 25 an element 37 of a universal joint connection 26 is pivotally connected by a horizontal pin 39 between a pair of link elements 31. A vertical pin 40 connects the universal joint element 37 with another universal joint element 41. The universal joint element 41 is pivotally supported on a pin 42 which extends with press fit through openings 43 in a flight mounting link element 27. The pins 42 permanently connect the elements 27 to the other elements of the chain and are shown, for purposes of illustration, as headed over at 44, for this purpose. The pin ends 45 constitute frustoconical bosses projecting beyond the plane outer surfaces 46 of the link elements 27.

The link elements 27 are elongated, as may be seen in Fig. 3, and, as may also be noted from that figure, they are provided with arcuate ends 50, each arcuate end including three arcuate surfaces: an inner one 51, an outer one 52, and an intermediate one 53. The surface 52 is struck on a shorter radius than the surface 51, and the surface 53, which is at the bottom of a groove 54 formed in an end of an element 27, is struck on the shortest radius of all. The radii on which these end surfaces are struck have their centers in a line midway between the sides and midway between the ends of the elements 27. The elements 27 carry pin elements 57 suitably rigidly secured thereto, herein as by mounting in bores 58 and welding as at 59. The pins are so disposed that their axes include the centers from which the radii of curvature of the arcuate surfaces 51, 52 and 53 at each end of the element 27 extend. It will now be appreciated that each element 27 has at each end thereof a groove 54 in its ends, that the portion thereof 60 which lies inwardly of the groove, that is, which is nearer the center of the chain, and supports the arcuate surface 51 constitutes one side of the groove 54 and that a flange, as it were, 63, supporting the arcuate surface 52 is disposed outwardly of the groove 54 and constitutes the other side of the groove.

The flight elements 28, whose material moving portions 65 may be of any desired cross section, will be observed to taper from their ends nearer chain 24 to their outer ends, and they have enlarged heads or attachment portions 70. The attachment portions 70 include a base portion 71 and hooked portions 72 arranged at the opposite ends of the base portion. Between the hooked portions 72 there is a recess 73. The hooked portions 72 are each undercut or grooved as at 75 so that a flange portion 76 is left on each hooked portion, these flanges being of a width in the direction measured lengthwise of the flights to fit the grooves 54 and they are received in the grooves 54 when the flights are in working position on the chain 24. The flanges have arcuate (concave) surfaces 77 formed on them, closely corresponding in curvature to the bottom surfaces 53 of the grooves 54. At the deepest portions of the undercuts 75 there are surfaces 78 matching with the surfaces 52 and snugly fitting these in the assembled position of the flight on the element 27. The bottom of the recess 73 has a bore 80 formed in its midway between the surfaces 78, this bore being of a size snugly to receive the cylindrical pin element 57. At an appropriate distance from the bore 80 the head 70 of each flight is provided with an internally threaded bore 82 receiving a threaded screw element 83 counterbored at 84 to coact with the headed over (frusto-conical) end 45 of an alined pin 42 and having its outer head suitably formed, see Fig. 4, as at 85 to cooperate with a tightening element. By arranging these screws as shown, interchangeability of the flights is provided with but one screw in each, but, if desired, the screws can be arranged over the rearward pins 42 or over both pins 42, or, when the duty of the chain is not heavy, over the forward pins only. Whenever the pins 42 are welded to the link elements 27 the arrangement shown will be satisfactory for any type of duty.

The mode of assembly of this arrangement will be easily understood. It will be appreciated that the chain 24 will be made up without any flights on it and that it will be a continuous chain, all of the link elements of which are permanently secured together. The elements 27 of the chain will be specially formed as noted and they will have the cylindrical pin elements 57 projecting oppositely from points midway between their ends. To apply the flights to the chain a workman will take a flight and position it with the bore 80 over, i. e. receiving, a pin element 57, bringing the parts into the position shown in Fig. 5 with the greater dimension of the head 70 at right angle to the greater dimension of the element 27. He will then turn the flight on the axis of the pin element 57, bringing the flange portions 76 into the grooves 54 and the surfaces 78 into contact with the surfaces 52. When this turning movement brings the parts to the position shown in Fig. 4, with the set screw 83 overlying one of the pins 42, the set screw will be tightened down hard against the headed over end of the pin, and, due to the projection of the end of the pin from the element 27 and the counterboring of the end of the screw 83, the flight will be rigidly locked against possible rotation about the axis of the pin element 57, and the flights will be securely held in the assembled relation to the chain 24 illustrated in Figs. 1, 2 and 4. Despite this most rigid mounting of the flights, it is readily possible, in the event a flight is too badly bent or is broken, to back out the set screw 83 until it clears the underlying frusto-conical boss 45, and then rotate the flight into the position of Fig. 5 relative to its supporting element 27, and move it off of the pin element 57, and replace it by another.

A modified form of construction is shown in Figs. 7 to 12. The principal difference between this modified construction and that of the first embodiment resides in the fact that instead of employing a pin 57 upon the link element 27, the link element 27' of this modification has a central bore 100 and the head 70' of the flight 28' has a projecting pin portion 101 which is received in the opening 100 when the parts are in assembled relation. The pins 42' in this illustrative form of the invention are shown as slightly longer than the pins 42 of the first form, and snap rings 102 are received in grooves 103 near the frusto-conical ends 104 of the pins 42'. This mode of holding the chain assembled is but illustrative of any suitable means for holding the pins 42' in fixed relation to the remaining portions of the chain, and is not per se of the essence of the invention.

It will be observed that the procedure followed in applying a flight 28' is precisely the same as with the first embodiment of the invention save that in this case, with the parts in the position shown in Fig. 12, the pin portion 101 is received in the bore 100 and the pin rotates in the bore as the parts are brought to the position shown in Fig. 11, in which latter position the tightening down of the screw 83' affects a rigid locking of the flight in position. The interlock between the frusto-conical head 104 of the pin 42' and the countersunk portion 84' of the screw 83' positively prevents relative rotation between the flight 28' and the link element 27'. The removal of a flight 28' is so similar to the removal of a flight 28 that no detailed explanation is called for.

Figs. 13 and 14 show another modification of the invention. This differs essentially from the embodiment previously described in but two or three points.

As in the first embodiment, the head 70" of the flight 28" is provided with a bore, herein numbered 80", and this bore is adapted to receive a pin 57", herein shown as formed integral with the elements 27". In this embodiment also it may be noted that a projecting annular portion 110 surrounds the mouth of the opening 80", with the result that the positioning of the flanges 76" to enter the grooves 54" is facilitated since this stops the parts with the flanges 76" in the same set of planes with the grooves 54". It may further be noted that the flanges 76" and grooves 75" are made of such depth there is cooperation between the surfaces 77" on the flanges 76" and the surfaces 53" at the bottom of the grooves 54", and also cooperation between the surfaces 78" at the bottoms of the grooves 75" and the surfaces 52" on the members 27". Incidentally it may be noted that this same double cooperation is disclosed in the modification of the invention shown in Figs. 7 to 12. After a flight is positioned on the chain as shown in Fig. 13 a pin 105 is passed through alined openings 106 in the flight 28" and 107 in the pin 57" and headed over to hold the parts assembled and against relative rotation. Pin 105 is protected against all but shearing stresses resulting from force tending to rotate the flight about the axis of pin 57".

It will be observed that three forms of the invention have been described. In each the same rigidity of mounting of the flights on the central chain will be secured. In each the flights are attached to the chain by a series of steps which includes bringing the head of the flight into a position at right angles to the length of the flight supporting side plate element of the chain and establishing an interfitting relationship between a projection on one of the parts to be attached together and a correspondingly shaped recess on the other. After this interconnection has been effected and the parts have been brought into such relationship that merely by rotation, while they are held in proper space relation to each other, there may be established an interfitting engagement between an arcuate groove and an arcuate projection at each end of a side plate element and at each end of the head or connecting portion of a flight. After the parts have been turned into the desired interfitting relationship, the threaded plug element shown will be screwed in and brought into interlocking engagement with an, as shown, somewhat tapered head of one of the connecting pins of the chain. In all of the forms of the invention illustrated it will be appreciated that a very strong connection is secured. The pin and recess portions provide not only for ease in positioning the parts, but also for added strength. The hook-like engagements at the ends of the link elements and flight support elements provide great strength, and the coaction between the countersunk ends of the threaded plugs and the frusto-conical heads of the chain pins provides for very positive securing of the flight elements against rotation to a position in which they may become detached from the chain.

While there are in this application specifically described three embodiments which our invention may assume in practice, it will be understood that these are shown for purposes of illustration and that the invention may be further modified and embodied in still other forms without departing from its spirit or the scope of the appended claims.

What we claim as new and desire to secure by Letters Patent is:

1. In a conveyor chain, chain elements spaced apart to receive a sprocket tooth between them, pivot pins passing through said elements and projecting from the opposite sides thereof, side links one at each side of said chain elements and traversed near their opposite ends by said pivot pins, said pins arranged to hold said side links and chain elements permanently together, and a pair of conveyor flights extending outwardly from the opposite sides of said chain and detachably secured to said side links while the latter remain permanently held to said pins, the detachable connections of said flights with said side links including arcuate tongue and groove connections having a common axis of curvature parallel to said pins.

2. In a conveyor chain, chain elements spaced apart to receive a sprocket tooth between them, pivot pins passing through said elements and projecting from the opposite sides thereof, side links one at each side of said chain elements and traversed near their opposite ends by said pivot pins, said pins arranged to hold said side links and chain elements permanently together, and a pair of conveyor flights extending outwardly from the opposite sides of said chain and detachably secured to and detachable from said side links while the latter remain permanently held to said pins, the detachable connections of said flights with said side links including tongue and groove connections at the extreme ends of said side links extending transversely of the latter and relatively slidable, to effect engagement and disengagement thereof, transversely of said side links, said tongue and groove connections being bisected by a plane including the axes of said pins.

3. In a conveyor chain, link elements spaced apart to receive a sprocket tooth between them, pivot pins passing through said elements and projecting from the opposite sides thereof, side links one at each side of said link elements and traversed near their opposite ends by said pivot pins, said pins headed to hold said side links and link elements together, and a pair of conveyor flights extending outwardly from the opposite sides of said chain and detachably secured to said side links, the detachable connections of said flights with said side links including a pin and socket connection in line with the longitudinal axis of said flight and arcuate tongue and groove connections conforming in curvature to arcs struck from the axis of said pin and socket connection.

4. The structure recited in claim 3, wherein said arcuate tongue and groove connections are at the ends of said side links in the assembled relation of said conveyor flights and side links.

5. In a conveyor chain, link elements spaced apart to receive a sprocket tooth between them, pivot pins passing through said elements and projecting from the opposite sides thereof, side links one at each side of said link elements and traversed near their opposite ends by said pivot pins, said pins holding said side links and link elements permanently together, and a pair of conveyor flights extending outwardly from the opposite sides of said chain and detachably secured to said side links, the detachable connections of said flights with said side links including recesses in the ends of said side links, hooked ends on said flights engageable in said recesses and means including an end of one of said pins and a set screw having a socket to fit over said pin end for preventing separation of said hooked ends from said recesses.

6. In a conveyor chain, link elements spaced apart to receive a sprocket tooth between them, pivot pins passing through said elements and projecting from the opposite sides thereof, side links one at each side of said link elements and traversed near their opposite ends by said pivot pins, said pins holding said side links and link elements permanently together, and a pair of conveyor flights extending outwardly from the opposite sides of said chain and detachably secured to said side links, the detachable connections of said flights and said side links including pivotal connections arranged substantially midway between the ends of said side links, arcuate tongue and groove connections spaced from said pivotal connections and a locking set screw between said pivotal connetcions and said tongue and groove connections.

7. In a conveyor chain, link elements spaced apart to receive a sprocket tooth between them, pivot pins passing through said elements and projecting from the opposite sides thereof, side links one at each side of said link elements and traversed near their opposite ends by said pivot pins, said pins holding said side links and link elements together, and a pair of conveyor flights extending outwardly from the opposite sides of said chain and detachably secured to said side links, the detachable connections of said flights and said side links including pivotal connections arranged substantially midway between the ends of said side links, arcuate tongue and groove connections spaced from said pivotal connections and a locking set screw between said pivotal connections and said tongue and groove connections and coacting with the end of one of said pivot pins.

8. In a conveyor chain, chain elements arranged end to end and spaced apart to receive a sprocket tooth between them, a pivot pin extending through each element and projecting outwardly from each side thereof, and side elements one at each side of said chain elements and traversed by said pins, said pins at their ends carrying means for securing said side elements against removal from the pins and against separation from said chain elements, each of said side elements having a laterally projecting pin between its ends extending in a direction away from the corresponding pin portion of the other and, at each of its opposite ends and opening through the end surfaces of the latter, arcuate grooves spaced from its outer surface and conforming in curvature to an arc struck from the axis of said pin.

9. A flight for a conveyor chain including a base portion for the attachment of the flight to a chain and a portion extending from said base portion and adapted to engage and move material, said base portion having arcuate flanges projecting therefrom in a direction opposite the direction in which said second portion extends and themselves extending transversely of said base portion at the opposite side of the latter from said material engaging and moving portion and conforming to arcs struck from a point between said flanges and lying in a plane to which the portion extending from the base portion is perpendicular, and a pivot pin midway between said flanges.

10. A flight for a conveyor chain including a base portion for the attachment of the flight to a chain and a portion extending from said base portion and adapted to engage and move material, said base portion having arcuate flanges projecting therefrom in a direction opposite the direction in which said second portion extends and themselves extending transversely of said base portion at the opposite side of the latter from said material engaging and moving portion and conforming to arcs struck from a point between said flanges and lying in a plane to which the portion extending from the base portion is perpendicular, a pivot pin midway between said flanges, and a set screw between said pivot pin and one of said flanges.

11. A flight for a conveyor chain including a base portion for the attachment of the flight to a conveyor chain, and a portion extending from said base portion and adapted to engage and move material, said base portion having a pivot-receiving socket, a flange projecting from said base portion in a direction opposite that in which said second portion extends and formed on an arc struck from the axis of said socket, and a locking element between said flange and socket.

12. In a conveyor chain, link elements spaced apart to receive a sprocket tooth between them, pivot pins passing through said elements and projecting from the opposite sides thereof, side links one at each side of said link elements and traversed near their opposite ends by said pivot pins, said pins holding said side links and link elements permanently together, and a pair of conveyor flights extending outwardly from the opposite sides of said chain and detachably secured to said side links, the detachable connections of said flights and said side links including pivotal connections arranged substantially midway between the ends of said side links, said pivotal connections including a pin carried by each side link and fixed in a bore in the latter, arcuate tongue and groove connections spaced from said pivotal connections and a locking set screw between said pivotal connections and said tongue and groove connections.

13. In a conveyor chain, link elements spaced apart to receive a sprocket tooth between them, pivot pins passing through said elements and projecting from the opposite sides thereof, side links one at each side of said link elements and traversed near their opposite ends by said pivot pins, said pins holding said side links and link elements permanently together, and a pair of conveyor flights extending outwardly from the opposite sides of said chain and detachably secured to said side links, the detachable connections of said flights and said side links including pivotal connections arranged substantially midway between the ends of said side links, said pivotal connections including a circular bore having its mouth surrounded by an annular boss and a pin received in said circular bore, arcuate tongue and groove connections spaced from said pivotal connections and means for preventing relative rotation between said flights and said side links about the axes of said circular bore and pin including a pin extending diametrically of said circular bore.

14. In a conveyor chain, link elements spaced apart to receive a sprocket tooth between them, pivot pins passing through said elements and projecting from the opposite sides thereof, side links one at each side of said link elements and traversed near their opposite ends by said pivot pins, said pins holding said side links and link elements permanently together, and a pair of conveyor flights extending outwardly from the opposite sides of said chain and detachably secured to said side links, the detachable connections of said flights and said side links including pivotal connections arranged substantially midway between the ends of said side links, said pivotal connections including a circular bore and a pin received in the latter, said pins carried by said flights and disposed centrally of the inner ends of the latter, arcuate tongue and groove connections spaced from said pivotal connections and means for preventing relative rotation between said flights and said side links about the axes of said circular bore and pin including a locking set screw between said pivotal connections and said tongue and groove connectitons.

15. In a conveyor chain, link elements spaced apart to receive a sprocket tooth between them, pivot pins passing through said elements and projecting from the opposite sides thereof, side links one at each side of said link elements and traversed near their opposite ends by said pivot pins, said pins holding said side links and link elements together, and a pair of conveyor flights extending outwardly from the opposite sides of said chain and detachably secured to said side links, the detachable connections of said flights and said side links including pivotal connections arranged substantially midway between the ends of said side links, said pivotal connections including a circular bore and a pin received in the latter, arcuate tongue and groove connections spaced from said pivotal connections and means for preventing relative rotation between said flights and said side links about the axes of said circular bore and pin.

16. In a conveyor chain, link elements spaced apart to receive a sprocket tooth between them, pivot pins passing through said elements and projecting from the opposite sides thereof, side links, one at each side of said link elements and traversed, near their opposite ends by said pivot pins, said pins holding said side links and said link elements permanently together, and a pair of conveyor flights extending outwardly from the opposite sides of said chain and detachably secured to said side links, the detachable connections of said flights with said side links including recesses in the ends of said side links, hooked ends on said flights engageable in said recesses and means for preventing separation of said hooked ends from said recesses spaced from both said ends and said recesses.

17. In a conveyor chain, link elements spaced apart to receive a sprocket tooth between them, pivot pins passing through said elements and projecting from the opposite sides thereof, side links one at each side of said link elements and traversed near their opposite ends by said pivot pins, said pins holding said side links and link elements together, and a pair of conveyor flights extending outwardly from the opposite sides of said chain and detachably secured to said side links, the detachable connections of said flights with said side links including a pin and socket connection between and parallel to the axes of said pins and arcuate tongue and groove connections conforming in curvature to arcs struck from the axis of said pin and socket connection.

References Cited in the file of this patent

UNITED STATES PATENTS

| Number | Name | Date |
|---|---|---|
| 594,043 | Thompson et al. | Nov. 23, 1897 |
| 1,169,351 | Quay | Jan. 25, 1916 |
| 1,427,229 | Robbins et al. | Aug. 29, 1922 |
| 1,487,198 | Bowman | Mar. 18, 1924 |
| 1,550,088 | McNeil | Aug. 18, 1925 |
| 1,762,776 | Gardner | June 10, 1930 |
| 1,770,650 | Levin | July 15, 1930 |
| 2,276,978 | Hyman | Mar. 17, 1942 |
| 2,290,077 | Sinden | July 14, 1942 |
| 2,372,925 | Ball | Apr. 3, 1945 |
| 2,435,768 | Biggs | Feb. 10, 1948 |
| 2,450,501 | Clarkson | Oct. 5, 1948 |
| 2,544,191 | Tomfohrde | Mar. 6, 1951 |

FOREIGN PATENTS

| Number | Country | Date |
|---|---|---|
| 203,970 | Germany | Aug. 1, 1905 |
| 26,064 | Great Britain | of 1909 |
| 218,065 | Great Britain | July 3, 1924 |
| 333,970 | Great Britain | Aug. 28, 1930 |